Figure 1:
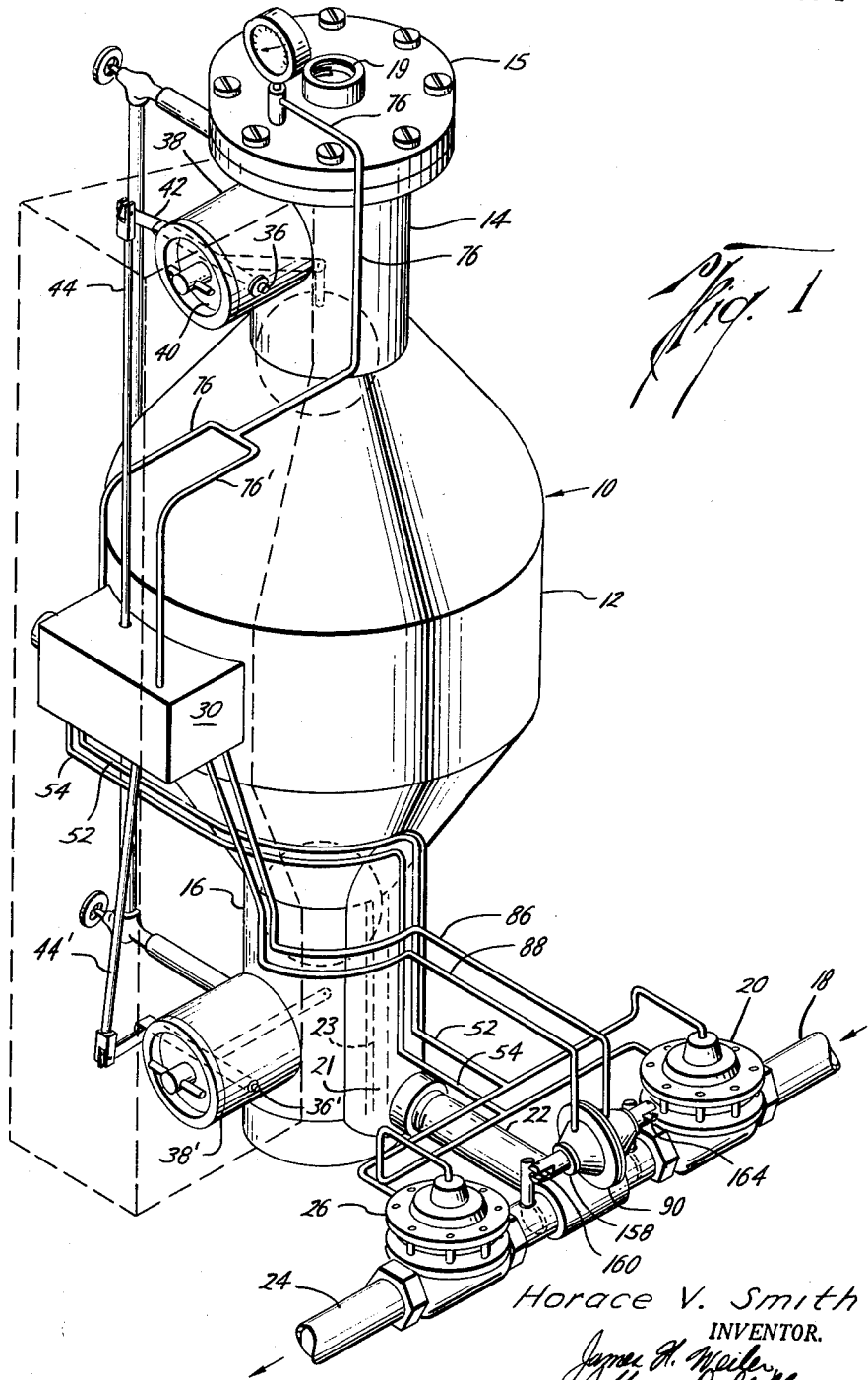

July 24, 1962 H. V. SMITH 3,045,485
LIQUID METERING APPARATUS
Filed Sept. 20, 1960 4 Sheets-Sheet 1

Horace V. Smith
INVENTOR.
BY
ATTORNEY

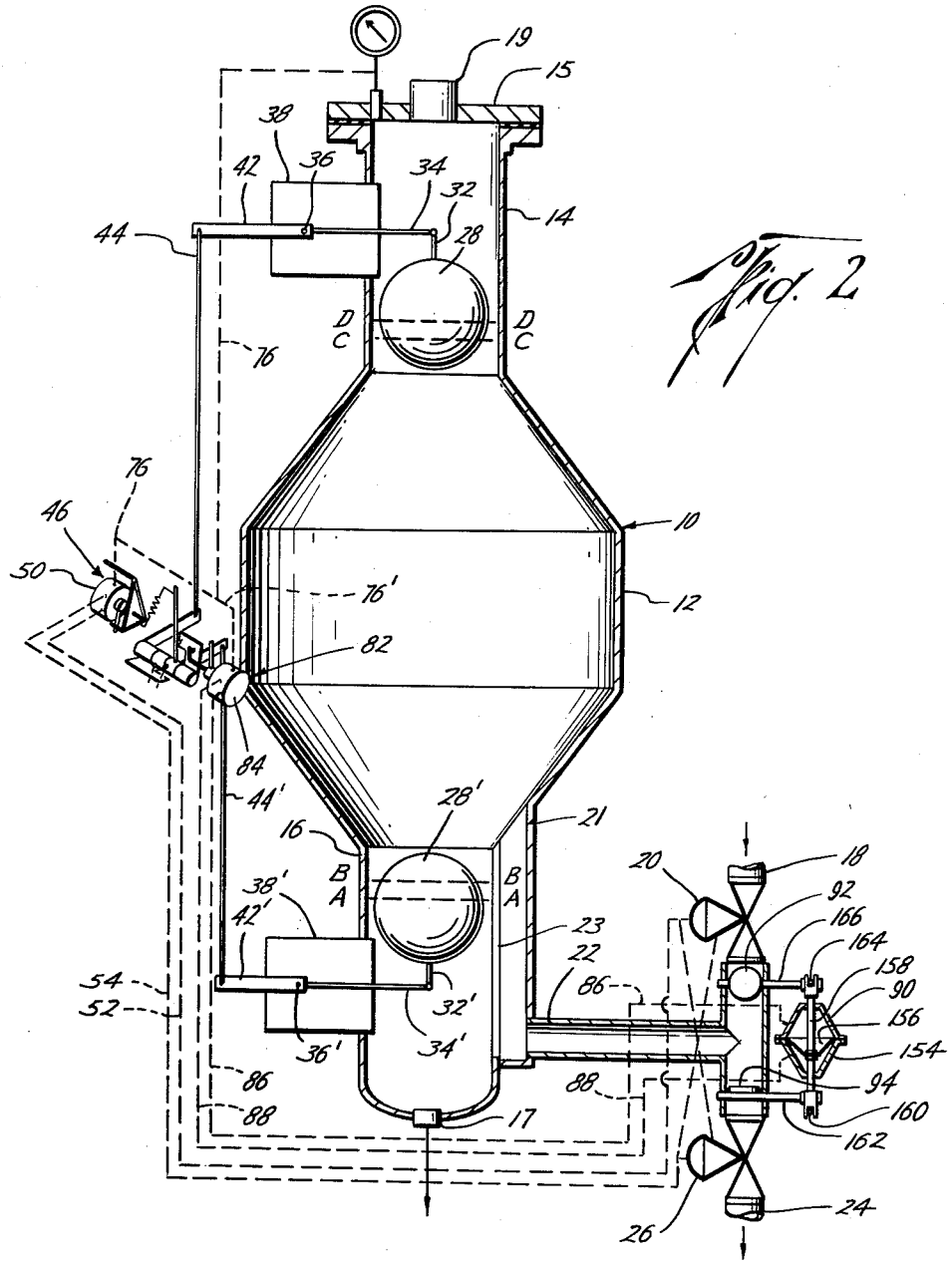

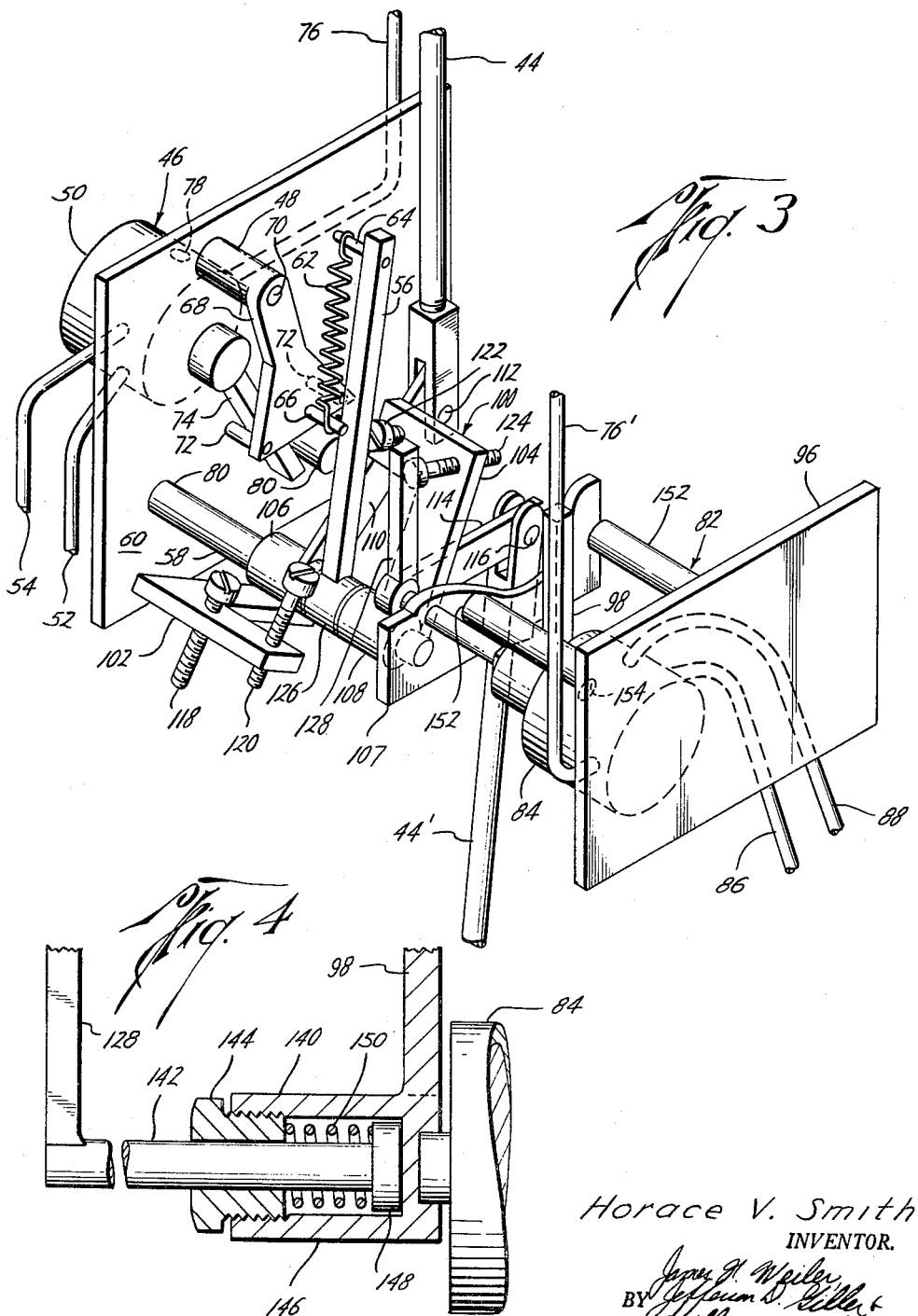

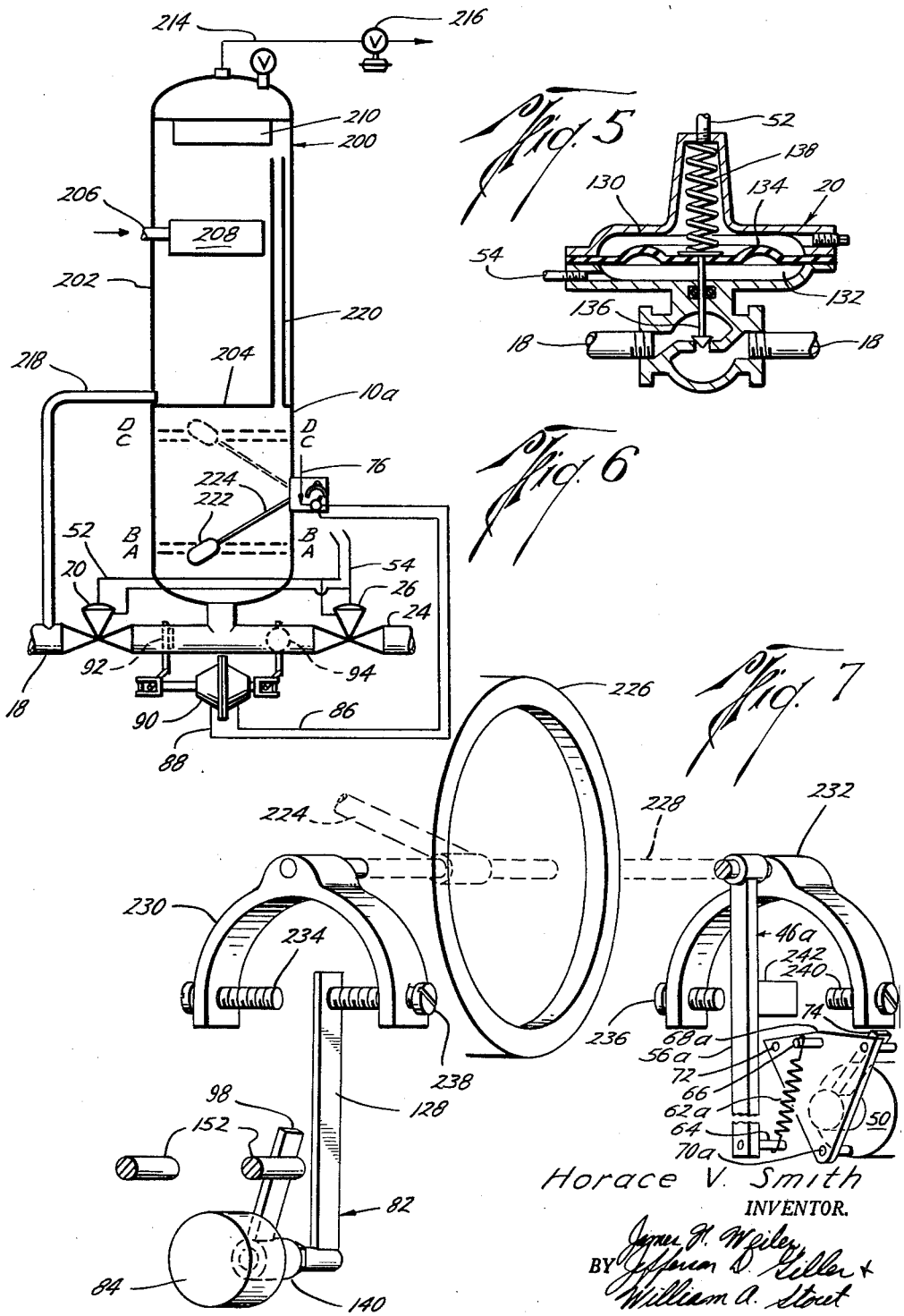

United States Patent Office 3,045,485
Patented July 24, 1962

3,045,485
LIQUID METERING APPARATUS
Horace V. Smith, Houston, Tex., assignor to Oil Metering and Processing Equipment Corp., Houston, Tex., a corporation of Texas
Filed Sept. 20, 1960, Ser. No. 57,221
16 Claims. (Cl. 73—224)

The present invention relates to an improved liquid metering apparatus and more particularly to a liquid metering apparatus in which the rate of flow into and out of a liquid container is reduced or throttled immediately prior to the liquid level reaching predetermined upper and lower levels.

There is a need for a highly accurate, efficient and reliable metering apparatus particularly for use in connection with metering of oil and water from oil and gas wells. There have been liquid metering apparatus proposed for this use but they do not function accurately when metering liquids under high rates of flow and especially do not function accurately when the rates of flow are varied. Due to varying pressures on inlet lines to the meters, on outlet lines from the meters, and within the meters themselves, the rates of flow of liquid often vary considerably.

Accordingly, it is a major object of the present invention to provide an improved metering apparatus which efficiently and reliably meters liquid at high rates of flow and at varying rates of flow.

For metering liquids there is a type of apparatus in which a liquid container is alternately filled and emptied between predetermined upper and lower liquid levels with each cycle of filling and emptying being counted, thereby metering the amount of liquid passing through the apparatus. Liquid passing into and out of the metering apparatus passes through inlet and outlet valves with the inlet valve being open and the outlet valve being closed during the filling of the liquid container, and the outlet valve being open and the inlet valve being closed during the draining of the liquid container. These inlet and outlet flow valves are actuated at the predetermined upper and lower liquid levels by a float assembly within the liquid container. To be accurate in its metering the liquid container must contain the same volume of liquid for each cycle of operation but such a condition is difficult to obtain with rapid flow of liquid through the meter or when the rate of flow varies.

When liquids flow rapidly into or out of the liquid container they often create a vortex and other surface disturbances which are not identical for each cycle of metering and which cause the float assembly to actuate the flow valves at different volumes. This is particularly true where the rates of flow into and out of the meter are varied.

Additionally, with the use of pneumatic controls for flow valves, there is a lag between the movement of the float assembly and the actuation of the flow valves. The length of time of this lag is not always constant as the lag is caused to vary by several factors such as temperature change and other conditions which change the friction within the valve control system. During this lag liquid continues to fill or drain from the meter. When the lag is constant, if the rates of flow into and out of the meter vary, then the amount of liquid flowing into or emptying from the meter will vary for each cycle causing inaccuracies in metering. If the rates of flow of liquid into and out of the meter remain constant, and the lag varies, the amount metered each cycle will vary with the inaccuracies being greater with higher rates of flow.

Accordingly, it is another general object of the present invention to provide an improved metering apparatus in which a float assembly actuates flow valves for identical volumes of liquid for each cycle of operation regardless of the rate of liquid flow into and/or out of the apparatus.

A more particular object of the present invention is to provide such an improved liquid metering apparatus in which the rate of flow of liquid into the apparatus is reduced or throttled immediately prior to liquid in the liquid container reaching the upper level and in which the flow out of the apparatus is likewise throttled immediately prior to the liquid in the liquid container reaching the lower level but in which apparatus there is no throttling or reduction of the flow at any other time. By such improved apparatus the rate of filling and the rate of emptying of the liquid container are reduced to the same, or nearly the same, rate the moment before the float assembly actuates the inlet and outlet flow valves and thus the conditions at which the inlet and outlet flow valves are operated are consistently reproduced regardless of high and varied rates of metering.

A still further object of the present invention is to provide such an improved liquid metering apparatus as just described in which the float assembly that throttles the flow at either of the predetermined liquid levels also actuates the flow valves at that particular level and in which the flow valves are snapped open and closed at the predetermined liquid levels.

Yet a further object of the present invention is the provision of such an improved metering apparatus which is easily adjustable, relatively inexpensive to manufacture, maintain, and repair and is dependable in operation.

Other and further objects, features and advantages will be apparent from the following description of the preferred examples of the present invention, given for the purpose of disclosure, and taken in conjunction with the accompanying drawings where like character references designate like parts throughout the several views and where:

FIGURE 1 is a perspective view of one form of the improved metering apparatus of the present invention, FIGURE 2 is a partially schematic illustration of the apparatus of FIGURE 1, FIGURE 3 is a perspective view of portions of the throttle valve control assembly, flow valve control assembly, and movable engageable members for operation of the flow and throttle valves, FIGURE 4 is a cross-sectional view of the friction clutch of the throttle valve control assembly, FIGURE 5 is a partially schematic cross-section of a preferred flow valve, FIGURE 6 is a partly schematic illustration of a modified form of improved liquid metering apparatus, and FIGURE 7 is a perspective view of a portion of the throttle valve control assembly, the flow valve control assembly, and the engagable members for controlling the flow valves and throttle valves of the modification of FIGURE 5.

Referring to the drawings, and particularly to FIGURES 1 and 2, a metering vessel or liquid container 10 is provided which has a main liquid compartment or centrally enlarged body portion 12 with upper and lower reduced diameter necks 14 and 16 respectively. The upper neck 14 is closed by a removable cap 15 for access to the interior of the liquid container 10 and the lower neck 16 is provided with a conventional drain 17. A connection 19 in the cap 15 is provided for a conventional pressure equalizing line.

A liquid inlet flow line 18 controlled by an inlet flow valve 20 is connected to a common flow line 22 extending into the liquid container 10 at the lower end of a vertical flow channel 21 attached to the side of the lower neck 16. A narrow flow slot 23 in the wall of the lower neck establishes liquid communication between the lower neck 16 and the flow channel 21 so the liquid level in each is always the same. Similarly, a liquid outlet or flow line 24 controlled by an outlet flow valve 26 is connected to the common flow line 22. Thus, upon opposite action of the valves 20 and 26 liquid, such as oil, fills and drains from the liquid container 10.

Disposed within the liquid container 10 is a float assembly which in the particular form here illustrated includes an upper float 28 in the upper neck 14 and a lower float 28' in the lower neck 16. Each of the floats 28 and 28' is connected by linkage to a movable engaging mechanism located in a box 30 on the side of the liquid container 10 (see FIGURE 1). The linkage associated with the upper float 28 includes a first float arm 32 secured at its lower end to the upper float 28 and pivotally secured at its upper end to a second float arm 34 which second float arm 34 is rigidly secured at its other end to a rock shaft 36 extending through a nozzle 38 which nozzle 38 opens to and extends from one side of the upper neck 14. The outer end of the nozzle 38 is closed by a cap 40. Thus, as the upper float 28 rises and falls with changing liquid levels in the upper neck 14 the float arms 32 and 34 cause rotation of the rock shaft 36.

Exterior of the nozzle 38 is an arm 42 rigidly secured at one end to the rock shaft 36 and pivotally secured at its other end to a vertical rod 44 whereby oscillating movement of the rock shaft 36 causes a reciprocating movement of the rod 44.

Similar linkage and a nozzle are associated with the lower float 28' and are given the same numbers primed as those given to the linkage and nozzle associated with the upper float 28.

Movement of the linkage connected to the upper and lower floats 28 and 28' of the float assembly actuates a movable engaging mechanism, later described, which operates a flow valve control assembly controlling the inlet and outlet valves 20 and 26 and a throttle valve assembly operating throttle valves later described.

As best illustrated in FIGURE 3, the movable engaging mechanism, indicated generally by the numeral 100, includes a pair of L-shaped brackets 102 and 104 forming first and second movable engaging members. These brackets 102 and 104 are independently rotatively secured by the journal bearings 106 and 108 to a shaft 58 extending from mounting plates 60 and 107. An arm 110 is rigidly secured to the journal bearing 106 at one end and is pivotally secured at the other end by the pin 112 to the lower end of the rod 44 whereby reciprocating movement of the rod 44 rotatably oscillates the L-shaped bracket 102. Similarly, an arm 114 is rigidly secured at one end to the journal bearing 108 and is pivotally secured at its other end by the pivot pin 116 to the upper end of the rod 44' whereby reciprocating movement of the rod 44' causes oscillating rotation of the L-shaped bracket 104. Threaded through the L-shaped bracket 102 are the contact screws 118 and 120 and threaded through the other L-shaped bracket 104 are the contact screws 122 and 124 by which suitable adjustment may be made for calibration of the metering apparatus as later described.

Pivotally mounted at its lower end on the shaft 58 by a journal bearing 126 is an upstanding swing arm or movable engageable member 56 of a flow valve control assembly 46 which swing arm 56 is contacted by the contact screws 118 and 122 and moved from side to side. A swing arm or movable engageable member 128 of a throttle valve control assembly 82 is pivotally mounted in a position to be contacted and moved from side to side by the contact screws 120 and 124. As illustrated in FIGURE 3, the contact screws 120 and 124 extend farther from the brackets 102 and 104 than the contact screws 118 and 122 so that the movable engageable member 128 of the throttle valve control assembly 82 is moved before the movable engageable member 56 of the flow valve control assembly 46 for a purpose which will be explained later.

The flow valve control assembly 46 includes a snap acting mechanism 48 which operates a 4-way pilot valve 50. First and second pressure lines 52 and 54 extend from the pilot valve 50 to the inlet and outlet flow valves 20 and 26 respectively for actuation of the flow valves by control of the flow of fluid pressure in the pressure lines.

The snap acting mechanism 48 includes as a whole the movable member or swing arm 56, a spring 62, and a pivot arm 68.

One end of the spring 62 is secured to a pin 64 extending from an upper portion of the swing arm 56 and the other end is secured to a pin 66 extending from the pivot arm 68. The pivot arm 68 is pivotally mounted by a shaft 70 in the mounting plate 60. Secured to and projecting from the lower end of the pivot arm 68 is a pair of spaced projections 72 forming contact members that straddle a pilot actuating arm 74 of the pilot valve 50 and strike the pilot actuating arm 74 when the pivot arm 68 is moved from side to side thereby moving the pilot actuating arm 74 and actuating the pilot valve 50. The pilot valve 50 is connected to a gas supply line 76 from the top of the liquid container 10 which supplies pressure to the pilot valve 50 with pressure being selectively directed by the pilot valve 50 through the first and second pressure lines 52 and 54 by movement of the pilot actuating arm 74. A conventional exhaust port 78 permits back pressure to drain from the pressure line 52 or 54 not then being supplied with fluid pressure.

The tension spring 62 is connected to the swing arm 56 on one side of the shaft 70 forming the pivot point of the pivot arm 68 and connected to the pivot arm 68 on the other side of the shaft 70. Thus the tension of the spring 62 tends to hold the pivot arm 68 on whatever side of the shaft 70 the upper end of the spring 62 is at that time.

To prevent the pivot arm 68 from damaging the pilot valve 50 when the pilot actuating arm 74 is thrown from side to side by the projections 72, and to stop the pilot valve 50 in the correction positions, a pair of stops 80 extend outwardly from the plate 60 on each side of the pilot actuating arm 74. The shaft 58 forms one of these stops 80. These stops 80 are spaced so that the pilot actuating arm 74 has sufficient movement to operate the pilot valve 50 but are placed close enough together to prevent damage to the pilot valve 50.

In operation of this flow valve control assembly 46 the contact screws 118 and 112, for reasons later described, alternately contact the swing arm 56 and swing it first in one direction and then in the other. As the swing arm 56 moves from one side to the other tension on the spring 62, when it passes the straight line through the shaft 70 and the pin 66, snaps the pivot arm 68 from one extreme position to the other. As the pivot arm 68 is oscillated on its shaft 70 the projections 72 strike the pilot actuating arm 74 actuating the pilot valve 50.

The projections 72 are spaced farther apart than the width of the pilot actuating arm 74 so that only one of such projections 72 is in contact with the pilot actuating arm 74 at any one time and there is space between the pilot actuating arm 74 and the other projection 72. Additionally, because the pivot arm 68 contacts the pilot actuating arm 74 only by the projections 72, if there should be any creeping of the pivot arm 68 before the spring 62 passes the shaft 70, such motion is not transmitted to the pilot actuating arm 74 because the particular projection 72 which will strike the pilot actuating arm 74 is spaced from it. This lost motion between the pivot arm 68 and the pilot actuating arm 74, in the event there should be any "creeping" of the pivot arm 68, together with the action of the spring 62, prevent any "creeping" of the pilot valve 50 and the pilot valve 50 is snap acted by the striking of one of the projections 72 when the tension on the spring 62 finally snaps the pivot arm 68.

This snap acting mechanism is claimed in Patent No. 2,818,738 granted January 7, 1958 to H. V. Smith, et al., for Snap Acting Mechanism. The pilot valve 50 is readily available on the market and no further description thereof is necessary.

As best illustrated in FIGURES 1 and 2, the pressure lines 52 and 54 from the pilot valve 50 are branched and connected to and actuate the inlet and outlet flow valves 20 and 26 respectively which are preferably double acting motor valves.

Referring to FIGURE 5, there is illustrated the inlet flow valve 20 which is identical to the outlet flow valve 26. This valve 20 includes a valve closing chamber 130 and a valve opening chamber 132 separated by a flexible diaphragm 134 connected to a valve stem 136 so that the application of pressure to the valve closing chamber 130 from the line 52 and simultaneous draining of pressure from the valve opening chamber 132 through the line 54 causes the valve to close and similarly the application of pressure to the valve opening chamber 132 and simultaneous draining of pressure from the valve closing chamber 130 causes the valve to open. A compression spring 138 continuously urges the valve stem 136 downwardly to aid in closing the valve and to hold it closed when there is no pressure differential between the valve closing and opening chambers 130 and 132 respectively. Such a valve is readily available commercially and no further description thereof is deemed necessary.

Referring to FIGURES 3 and 4, the throttle valve control assembly 82 includes the movable engageable member or swing arm 128, a clutch assembly 140 and a pilot valve 84 which pilot valve is identical to the pilot valve 50. The lower end of the swing arm 128 is secured to one end of a rock shaft 142 which passes rotatively through a cap 144 threaded into one end of a cylindrical housing 146. The other end of the rock shaft 142 has a friction clutch plate 148 which is urged against an internal end of the cylindrical housing 146 by the force of a compression spring 150. Thus as the swing arm 128 is oscillatably rotated it oscillatably rotates the rock shaft 142 and through the friction of the clutch plate 148 oscillates the cylindrical housing 146. The cylindrical housing 146 is secured to the pilot valve 84 so that the oscillating rotation of the swing arm 128 actuates the pilot valve 84.

Secured to the cylindrical housing 146 is a pilot valve arm 98 which extends upwardly between spaced stops 152 secured to the mounting plate 96. As the pilot valve arm 98 is turned from side to side it is stopped by these stops 152 at the correct positions of the pilot valve 84. When the pilot valve arm 98 is stopped by one of the stops 152 the swing arm 128 can continue to move without damage to the pilot valve 84 as the swing arm 128 will overcome the friction between the friction clutch plate 148 and the cylindrical housing 146.

Fluid pressure is supplied to the pilot valve 84 through the branch line 76' of the fluid pressure line 76 with the pressure being alternately directed to and drained from the pressure lines 86 and 88 by the pilot valve 84. The pressure in the pressure lines 86 and 88 not then being supplied with pressure drains through an exhaust 154.

Also included in the throttle valve control assembly 82 is a diaphragm actuator 90 (FIGURES 1 and 2) which is connected to and actuates the throttle valves 92 and 94. The diaphragm actuator 90 includes a fluid tight housing 154 across which is secured a flexible diaphragm 156. A rod 158 extends slideably through the housing 154 and is secured to the diaphragm 156 so that movement of the diaphragm 156 causes reciprocating movement of the rod 158. One end of the rod 158 is pivotally connected to a pin 160 which pin is also secured to a post 162 rotatably extending into the outlet flow line 24. Secured to the lower end of this post 162 is the outlet throttle valve 94 which is a butterfly type valve having a slightly lesser diameter than the internal diameter of the outlet line 24 so that when the outlet throttle valve 94 is placed in throttling position, that is when it is closed as illustrated in FIGURES 1 and 2, some liquid will pass the outlet throttle valve 94.

The other end of the rod 158 is similarly pivotally connected to a pin 164 which is secured to a post 166 rotatably extending into the inlet flow line 18. Secured to this post 166 within the inlet line 18 is the inlet throttle valve 92 which also is of a slightly smaller diameter than the internal diameter of the inlet flow line 18. As illustrated in these FIGURES 1 and 2 the throttle valves 92 and 94 are oppositely acting so that when one is closed the other is open.

When fluid pressure is applied through the line 86 and drained from the line 88 the pressure causes the diaphragm 156 to move to the left as viewed in FIGURE 1 carrying with it the rod 158 which rotates both posts 162 and 166 closing the outlet throttle valve 94 and opening the inlet throttle valve 92. When the pressure in the pressure lines 86 and 88 is reversed the diaphragm moves to the right rotating the posts 162 and 166 and oppositely actuating the flow valves 92 and 94.

In operation of the device shown in FIGURES 1 through 5, the cycle starts with the liquid level in the liquid container 10 being at the lowest level, that is the level A—A illustrated in FIGURE 2. The floats 28 and 28' of the float assembly are at their lowest point, the inlet flow valve 20 and the inlet throttle valve 92 are open, and the outlet flow valve 26 and the outlet throttle valve 94 are closed. Liquid flows into the liquid container through the inlet line 18 and the flow line 22. As the liquid level rises in the liquid container 10 the float 28' moves upwardly which, through its linkage, moves the vertical rod 44' downwardly. This downward movement of the rod 44' rotates the movable engaging member 104, of the movable engaging mechanism 100, to the right and withdraws the contact screws 122 and 124 from the swingarms 56 and 128 respectively. When the desired amount of movement of the movable engaging member 104 has been achieved the movement of the lower float 28' is stopped by stop members, not shown, bearing against the lower float arm 34' in the nozzle 38'.

When the liquid level in the liquid container 10 approaches the upper throttling level C—C the upper float 28 of the float assembly is moved upwardly which movement, through the float linkage, moves the vertical rod 44 downwardly. This downward movement of the rod 44 rotates the movable engaging member 102 of the movable engaging assembly 100 to the right as illustrated in FIGURE 3. The contact screw 120 of the movable engaging member 102 contacts the swing arm 128 of the throttle valve control assembly 82 and moves it to the right operating the throttle valve 84, reversing the direction of fluid pressure in the lines 86 and 88. This reversal of fluid pressure in the lines 86 and 88 operates the diaphragm actuator 90 causing the inlet throttle valve 92 to close and the outlet throttle valve 94 to open. This actuation of the throttle valves occurs when the liquid level in the liquid container 10 reaches the upper throttling level C—C. By the closing of the inlet throttle valve 92 the rate of flow of liquid into the liquid container 10 is reduced as only the liquid passing around the closed throttle valve 92 will enter the liquid container 10.

The upper float 28 continues its upward movement causing further downward movement of the rod 44 and further oscillation to the right of the movable engaging member 102. Upon such further movement the contact screw 118 contacts the swing arm 56 of the flow valve control assembly 46 and moves the swing arm 56 to the right until the pivot arm 68 is snapped to the right thereby moving the pilot actuating arm 74, actuating the pilot valve 50, and reversing the direction of flow in the lines 52 and 54. This further movement to the right of the movable engaging member 102 causes the swing arm 128 of the throttle valve control assembly to be moved farther to the right by the contact screw 120 but because of the lost motion in the clutch 140 the pilot valve 84 is not affected.

The reversal of fluid pressure in the pressure lines 52 and 54 occurs at the upper liquid level D—D. This reversal of fluid pressure in the pressure lines 52 and 54 closes the inlet flow valve 20 and opens the outlet flow valve 26 so that liquid in the liquid container immediately starts to drain out the outlet flow line 24. At this time the outlet throttle valve 94 is open, as previously described, and a full rate of draining is permitted.

As the liquid drains out the liquid container 10, the largest portion of it passes through the flow channel 21 directly from the enlarged body portion 12 and the remaining portion enters the flow channel 21 from the lower neck 16 at the flow slot 23. As thus constructed the downward rush of the draining liquid does not pull the lower float 28' downwardly with it which would occur if the draining occurred directly from the lower neck 16 below the lower float 28'.

As the upper float 28 descends with the descending liquid level in the liquid container 10, the vertical rod 44 rises rotating the movable engaging member 102 to the left away from the swing arms 56 and 128. When this movable engaging member 102 is moved a sufficient distance, further movement of the upper float 28 is prevented by stops, not shown, in the nozzle 38 acting on the upper float arm 34. Liquid in the liquid container continues to descend and, as it begins to uncover the lower float 28', the lower float 28' descends raising the vertical rod 44'. This rotates the movable engaging member 104 to the left causing the contact screw 124 to move the swing arm 128 of the flow valve control assembly 82 to actuate the pilot valve 84 and reverse the fluid pressure in the pressure lines 86 and 88. This reversal of flow of fluid in the pressure lines 86 and 88 causes the diaphragm actuator 90 to actuate the throttle valves 92 and 94 to close the outlet throttle valve 94 and open the inlet throttle valve 92 thereby reducing the rate of drainage out the liquid container 10 and the outlet line 24. This actuation of the throttle valves occurs when the liquid reaches the lower throttling level B—B.

Further movement to the left of the movable engaging member 104 causes the contact screw 122 to contact the swing arm 56 of the flow valve control assembly 46 and move it to the left until the pivot arm 68 is snapped actuating the pilot valve 50 and reversing the direction of flow in the pressure lines 52 and 54. This occurs when the liquid level reaches its lower level A—A. This further movement to the left of the movable engaging member 104 causes the swing arm 128 of the throttle valve control assembly to be moved farther to the left but because of the clutch 140 the pilot valve 84 is not affected.

When the pressure in the flow lines 52 and 54 is reversed the inlet and outlet flow valves 20 and 26 are reversed so that the inlet flow valve 20 opens and the outlet flow valve 26 closes and the liquid container 10 begins to fill repeating the cycle.

Thus, where rates of flow into or out of the meter are rapid but constant, the rate of flow into the liquid container 10 is reduced each cycle to the same rate at the upper throttling level C—C and the draining is reduced to the same rate at the lower throttling level B—B so the floats 28 and 28' of the float assembly are always subject to the same rate of flow at the time that the flow valves 20 and 26 are actuated by snap action. It may be in some instances that at the time the ascending liquid level reaches the upper throttling level C—C or the descending level reaches the lower throttling level B—B that the rate of flow into or from the liquid container 10 would be so low that the rate of filling or draining will not be reduced by the throttling. When this occurs the rate of flow at the moment of the actuation of the flow valves will not be the same as when the flow is reduced by the throttling action, but the rate of flow will be so slow that the effect of this difference upon the accuracy of the metering will be negligible.

Where rates of flow into and out of the meter are rapid and erratic the rate of flow into the liquid container 10 and out of the liquid container 10 will be reduced each cycle to almost the same rate at the upper throttling level C—C and again at the lower throttling level B—B, respectively. There will be a small difference in rates of flow during the various throttling periods because the varying pressures that cause erratic flow when the throttle valves 92 and 94 are open will also cause rate of flow differences when the throttle valves 92 and 94 are closed. However, because the area available for liquid flow at the throttling valves 92 and 94 when the throttling valves are closed is so much less than the area available for liquid flow when the throttling valves 92 and 94 are opened this difference in rate of flow during the throttling will have a negligible effect upon the accuracy of the metering.

The rate of flow during the throttling processes may be varied as desired by changing in any desired manner the cross-sectional area through which liquid flows at the throttling valves 92 and 94.

Referring to FIGURES 6 and 7, there is illustrated a modification in which the float assembly utilizes a single float and in which the liquid container is part of the metering separator. Those parts which are identical to the parts illustrated in FIGURES 1 through 5 are given the same numbers and those which are modified have the suffix "a."

The structure shown in FIGURE 6 is a metering separator 200 having an upper separating and accumulating chamber 202 and a lower liquid container 10a separated by a plate 204. The lower liquid container 10a has no reduced diameter necks 14 and 16 and thus has no need for a flow channel 21. Fluids, such as mixtures of liquids and gases, enter through a supply line 206 into the separating and accumulating chamber 202 where they strike a conventional deflector 208 and are separated by gravity into liquid and gas. The liquid falls to the bottom of the chamber 202 and the gas rises upwardly through a conventional mist extractor 210 and passes out a gas outlet line 214 against a back pressure valve 216. As the liquid accumulates in the lower part of the separating and accumulating chamber 202 it is periodically allowed to flow by gravity through the conduit 218 into and out of the liquid container 10a where it is metered. Pressure in the liquid container 10a and the separating and accumulating chamber 202 is equalized through the pressure equalizing line 220 extending between the liquid container 10a and an upper portion of the separating and accumulating chamber 202.

Located in the liquid container 10a is a single float 222 secured to one end of a float arm 224 extending into a nozzle 226 open to the interior of the liquid container 10a. The other end of this float arm 224 is rigidly secured to a rock shaft 228 which rotatably extends through the sides of the nozzle 226. Thus swinging movement of the float arm 224 in response to changing liquid levels oscillatably rotates the rock shaft 228. At one end of the rock shaft 228 is secured a yoke-shaped movable engaging member 230 which operates the movable engageable member or swing arm 128 of the throttle valve control assembly 82. At the other end of the rock shaft 228 there is rigidly secured another yoke-shaped movable engaging member 232 which actuates the flow valve control assembly 46a. The throttle valve control assembly 82 is identical to that illustrated in FIGURES 1 through 5 while the flow valve control assembly 46a is slightly modified.

The movable engageable member or swing arm 56a of the flow valve control assembly 46a is rotatably secured at its upper end to the rock shaft 228 and the spring 62a is secured to the lower end of the swing arm 56a at the pin 64. The upper end of the spring 62a is secured to the pivot arm 68a at the pin 66 and the pivot arm 68a is pivoted at the pin 70a. The projections 72 on the pivot arm 68a strike the pilot actuating arm 74 and actuate the pilot valve 50 in a manner similar to that illustrated in FIGURE 3.

All other portions of the structure illustrated in FIGURES 6 and 7 are identical to those shown in FIGURES 1 through 5. In operation of the modification shown in FIGURES 6 and 7, the cycle starts with the liquid level at the lowest level A—A. The inlet flow valve 20 and the inlet throttle valve 92 are open and the outlet flow valve 26 and outlet throttle valve 94 are closed. As liquid rises in the liquid container 10a the float 222 rises swinging the float arm 224 upwardly which rotates the rock shaft 228 in a clockwise direction as viewed in FIGURE 7. When this occurs the yokes 230 and 232 are likewise rotated in a clockwise direction moving the contact screw 234 on the yoke 230 and the contact screw 236 on the yoke 232 away from the swing arms 128 and 56a. As the float 222 moves upwardly and the liquid level in the liquid container 10a approaches the upper throttling level C—C the contact screw 238 on the movable engaging member 230 contacts the movable engageable member 128 of the throttle valve control assembly 82 and moves it to the left causing the inlet throttle valve 92 to close and the outlet throttle valve 94 to open when liquid reaches the level C—C. This reduces the rate of flow into the liquid container 10a.

Continued upward movement of the float 222 causes the contact screw 240, which is shorter than the contact screw 238, on the movable engaging member 232 to bear against the contact plate 242 secured to the swing arm 56a. This snaps the pilot actuating arm 74 and actuates the pilot valve 50. This occurs when the liquid level reaches the upper level A—A and causes the inlet flow valve 20 to close and the outlet flow valve 26 to open. The outlet throttle valve 94 is already open and a full rate of draining commences.

As the float 222 moves downwardly it rotates the rock shaft 228 in a counterclockwise direction withdrawing the contact screw 238 from the swing arm 128 and the contact screw 240 from the swing arm 56a. As the float 222 approaches the lower throttling level B—B the contact screw 234 on the movable engaging member 230, which contact screw 234 is longer than the contact screw 236 on the movable engaging member 232, contacts the swing arm 128 and moves it to the right operating the pilot valve 84 when the liquid reaches the level B—B. This closes the outlet throttle valve 94 and opens the inlet throttle valve 92 thereby reducing the rate of flow out of the liquid container 10a. Further downward movement of the float 222 and consequent rotation of the rock shaft 228 causes the contact screw 236 to bear against the contact plate 242 of the swing arm 56a and, when the liquid reaches the level A—A, snaps the pilot actuating arm 74 and actuates the pilot valve 50. This closes the outlet flow valve 26 and opens the inlet flow valve 20 for full filling flow into the liquid container 10a for a repetition of the cycle.

In the form of the device illustrated in FIGURES 1 through 5 adjustment of the contact screws 118, 120, 122, and 124 adjust the liquid levels at which the throttling valves and flow valves are actuated. Likewise in the modification illustrated in FIGURES 6 and 7 adjustment of the contact screws 234, 236, 238, and 240 adjust the liquid levels at which the throttle valves and control valves are operated. By such adjustment the metering action can be calibrated.

The present invention is well suited to carry out the objects and attain the advantages and ends mentioned as well as others inherent therein. Various rearrangements of parts and substitutions of parts will readily suggest themselves to those skilled in the art which are encompassed within the spirit of the invention and the scope of the appended claims.

What is claimed is:

1. In a liquid metering apparatus including, a liquid container, an inlet and an outlet line in communication with the liquid container, inlet and outlet flow valves in the inlet and outlet lines respectively, and a float assembly in the liquid container, the improvement comprising a throttle valve in one of said lines movable between open and throttling positions, a throttle valve control assembly connected to said throttle valve, said throttle valve control assembly including a movable engageable member adapted in a first position to place the throttle valve in throttling position and in a second position to open the throttle valve, a flow valve control assembly connected to the flow valves, said flow valve control assembly including a movable engageable member adapted in a first position to close one of said flow valves and open the other flow valve, and in a second position to open said one flow valve and close said other flow valve, a movable engaging mechanism approximate said engageable members adapted upon movement in one direction to move the engageable member of the throttle valve control assembly and then the engageable member of the flow valve control assembly to their respective first positions and upon movement in the opposite direction to move the engageable member of the throttle valve control assembly and then move the engageable member of the flow valve control assembly to their respective second positions, and linkage connecting said engaging mechanism and the float assembly adapted to move the engaging mechanism in said one direction and in said opposite direction as the liquid container drains and fills of liquid.

2. The improvement of claim 1 including lost motion linkage in the throttle valve control assembly.

3. The improvement of claim 1 including lost motion linkage in the flow valve control assembly.

4. The improvement of claim 1 including lost motion linkage in the throttle valve control assembly and the flow valve control assembly.

5. In a liquid metering apparatus including, a liquid container, an inlet and an outlet line in communication with the liquid container, inlet and outlet flow valves in the inlet and outlet lines respectively, and a float assembly in the liquid container, the improvement comprising a throttle valve in each of the inlet and outlet lines each such throttle valve movable between open and throttling positions, a throttle valve control assembly connected to said throttle valves, said throttle valve control assembly including a movable engageable member adapted in a first position to open the inlet throttle valve and place the outlet throttle valve in throttling position and in a second position to place the inlet throttle valve in throttling position and open the outlet throttle valve, a flow valve control assembly connected to the flow valves, said flow valve control assembly including a movable engageable member adapted in a first position to open the inlet flow valve and close the outlet flow valve and in a second position to close the inlet flow valve and open the outlet flow valve, a movable engaging mechanism approximate said engageable members adapted upon movement in one direction to first move the engageable member of the throttle valve assembly and then the engageable member of the flow valve control assembly to their respective first positions and upon movement in the opposite direction to first move the engageable member of the throttle valve control assembly and then move the engageable member of the flow valve control assembly to their respective second positions, and linkage connecting said engaging mechanism and the float assembly adapted to move the engaging mechanism in said one direction as liquid in the liquid container falls and to move the engaging mechanism in the opposite direction as liquid in the liquid container rises.

6. The improvement of claim 5 including lost motion linkage in the throttle valve control assembly.

7. The improvement of claim 5 including lost motion linkage in the flow valve control assembly.

8. The improvement of claim 5 including lost motion linkage in the throttle valve control assembly and the flow valve control assembly.

9. In a liquid metering apparatus including, a liquid container, an inlet and an outlet line in communication with the liquid container, and inlet and outlet flow valves in the inlet and outlet lines respectively, the improvement comprising a float in an upper portion of the liquid container and a float in a lower portion of the liquid container, a throttle valve in one of said lines movable between open and throttling positions, a throttle valve control assembly operatively connected to said throttle valve, said throttle valve control assembly including a movable engageable member adapted in a first position to place the throttle valve in throttling position and in a second position to open the throttle valve, a flow valve control assembly connected to the flow valves, said flow valve control assembly including a movable engageable member adapted in a first position to close one of said flow valves and open the other flow valve and in a second position to open said one flow valve and close said other flow valve, a movable engaging mechanism approximate said engageable members, said movable engaging mechanism including a first movable engaging member adapted to move reciprocally and upon movement in one direction to move the engageable member of the throttle valve control assembly and then the engageable member of the flow valve control assembly to their respective first positions and a second movable engaging member adapted to move reciprocally and, upon movement in a direction opposite to the said movement in one direction of the first movable engaging member, to move the engageable member of the throttle valve control assembly and then the engageable member of the flow valve control assembly to their respective second positions, and linkage connecting said first movable engaging member to one of said floats and linkage connecting the second movable engaging member to the other said float.

10. The improvement of claim 9 including lost motion linkage in the throttle valve control assembly.

11. The improvement of claim 9 including lost motion linkage in the flow valve control assembly.

12. The improvement of claim 9 including lost motion linkage in the throttle valve control assembly and the flow valve control assembly.

13. In a liquid metering apparatus including, a liquid container, an inlet and an outlet line in communication with the liquid container, and inlet and outlet flow valves in the inlet and outlet lines respectively, the improvement comprising a float in the upper portion of the liquid container and a float in a lower portion of the liquid container, a throttle valve in each of the inlet and outlet lines each such throttle valve moving between open and throttling positions, a throttle valve control assembly connected to said throttle valves, said throttle valve control assembly including a movable engageable member adapted in a first position to open the inlet throttle valve and place the outlet throttle valve in throttling position and in a second position to place the inlet throttle valve in throttling posiion and open the outlet throttle valve, a flow valve control assembly connected to the flow valves, said flow valve control assembly including a movable engageable member adapted in a first position to open the inlet flow valve and close the outlet flow valve and in a second position to close the inlet flow valve and open the outlet flow valve, a movable engaging mechanism approximate said engageable members, said movable engaging mechanism including a first movable engaging member adapted to move reciprocally and upon movement in one direction to move the engageable member of the throttle valve control assembly and then the engageable member of the flow valve control assembly to their respective first positions and a second movable engaging member adapted to move reciprocally and, upon movement in a direction opposite to said movement in one direction of the first movable engaging member, to move the engageable member of the throttle valve control assembly and then the engageable member of the flow valve control assembly to their respective second positions, and linkage connecting said first movable engaging member to the lower float and linkage connecting the second movable engaging member to the upper float whereby the first movable engaging member is actuated by liquid level in a lower portion of the liquid container and the second movable engaging member is actuated by liquid level in an upper portion of the liquid container.

14. The improvement of claim 13 including lost motion linkage in the throttle valve control assembly.

15. The improvement of claim 13 including lost motion linkage in the flow valve control assembly.

16. The improvement of claim 13 including lost motion linkage in the throttle valve control assembly and the flow valve control assembly.

References Cited in the file of this patent
UNITED STATES PATENTS

| | | |
|---|---|---|
| 2,678,658 | Rittenhouse | May 18, 1954 |
| 2,831,350 | Banks et al. | Apr. 22, 1958 |